United States Patent Office 2,709,690
Patented May 31, 1955

2,709,690

EPOXY RESINS ESTERIFIED WITH DRYING OIL FATTY ACIDS AND PHOSPHORIC ACID

Eric S. Narracott, Worcester Park, England, assignor to Shell Development Company, Emeryville, Calif., a corporation of Delaware No Drawing. Application May 19, 1952,
Serial No. 288,760

6 Claims. (Cl. 260—18)

This invention relates to a process for producing a mixed ester which is adapted to coating metal surfaces with protective films, particularly surfaces which consist wholly or primarily of aluminum, zinc and magnesium.

When protective coatings are applied to metals, it is often the practice to treat the metal surface with an initial primer which is known in the trade as an "etch primer," and then to apply conventional surface coatings such as undercoats and paints, varnishes or enamels, the etch primer serving to protect the metal from corrosion and also to bond the superimposed surface coatings to the metal.

Etch primers in use at present consist of a fluid organic polymer such as a mixture of polyvinyl alcohol and formaldehyde or butyraldehyde together with aqueous phosphoric acid. In such etch primers, the phosphoric acid is added to the polymeric material immediately before use, and the resulting mixture has an undesirably short pot life before gelling occurs and renders the primer unusable.

A method has now been discovered for producing a special mixed ester from an aromatic polyether compound which is esterified first with a drying oil fatty acid and then with phosphoric acid. The mixed ester can be applied as a film to metal surfaces where it will air-dry or can be baked to a hard tough protective coating having unusual adhesion. Furthermore, the pot life of the mixed ester is indefinite when stored in closed containers.

The esterifiable aromatic polyethers employed in the process are obtainable by reacting a polyhydric phenol with epichlorhydrin or dichlorhydrin and sufficient alkali to combine with the released hydrogen chloride. The polyethers of a dihydric phenol are particularly suited for use in the process. These polyethers have a chemical structure wherein the glyceryl radicals from the epichlorhydrin or dichlorhydrin and the divalent aromatic hydrocarbon radicals from the dihydric phenol are present as a chain with the two types of radicals alternating and being joined into the chain by ethereal oxygen atoms. The terminal groups of the chain in the polyethers may contain 1,2-epoxy groups due to the presence of a glycidyl radical thereat although some of the terminal groups may be dihydroxyl-glycerol radicals from hydration of the glycidyl radical.

The 1,2-epoxy equivalency of the glycidyl polyethers of a polyhydric phenol employed in the process is a value greater than 1.0, the 1,2-epoxy equivalency being the number of epoxy groups

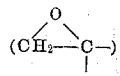

contained in the average molecule of the polyether. In the case of glycidyl polyethers of a dihydric phenol, the 1,2-epoxy equivalency is normally between 1.2 and 2.0.

The simplest of the polyethers are diglycidyl diethers of dihydric phenols which contain a single divalent aromatic hydrocarbon radical from the dihydric phenol and have two glycidyl radicals linked thereto by ethereal oxygen atoms. More generally, the polyether is of resinous character and contains two or more aromatic hydrocarbon radicals alternating with glyceryl groups which are connected therewith through ether oxygen atoms. Ordinarily, the polyether is a complex mixture of compounds rather than being a single particular compound. The principal product may be represented by the formula

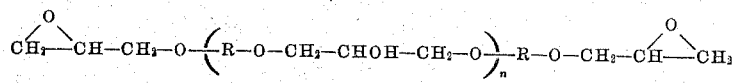

wherein $n$ is an integer of the series 0, 1, 2, 3 . . ., and R represents the divalent hydrocarbon radical of the dihydric phenol. While for any single molecule, $n$ will be an integer, the fact that the polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The esterifiable groups contained in the polyethers are attached to the glyceryl radicals

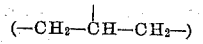

therein. These esterifiable groups are epoxy groups and alcoholic hydroxyl groups, both of which are attached to the glyceryl radicals. Upon reaction of the polyethers with the unsaturated fatty acids, both of these esterifiable groups form ester linkages to the glyceryl radicals by joinder thereto of acyloxy groups. While $n$ is ordinarily a value from 0 to about 12 in the polyethers, it is generally preferred to employ esters from polyethers wherein $n$ is about 2 to 9.

Any of the various dihydric phenols is used in preparing the esterifiable polyethers including mononuclear phenols such as resorcinol, catechol, hydroquinone, methyl resorcinol, etc.; or polynuclear phenols like 2,2-bis(4-hydroxyphenyl)propane (bis-phenol), 4,4' - dihydroxybenzophenone, bis(4-hydroxyphenyl)methane, 1,1-bis(4-hydroxyphenyl)ethane, 1,1 - bis(4 - hydroxyphenyl)isobutane, 2,2-bis(4-hydroxyphenyl)butane, 2,2-bis(4-hydroxy-2-methylphenyl)propane, 2,2-bis(4-hydroxy-2-tertiarybutylphenyl)propane, 2,2 - bis(2 - hydroxynaphthyl)pentane, 1,5 - dihydroxynaphthalene, etc.

The esterifiable polyethers are prepared, in general, by heating at about 50° C. to 200° C. the dihydric phenol with epichlorhydrin in a basic reaction medium. Depending upon the type of product desired, there is used from more than 1 to 2 or more mols of epichlorhydrin per mol of dihydric phenol. Also present is a base such as sodium hydroxide, generally in amount of about 5% to 30% stoichiometric excess of the epichlorhydrin, i. e., 1.05 to 1.3 equivalents of base per mol of epichlorhydrin. In effecting the reaction, the dihydric phenol is mixed with an aqueous solution of the base and heated. The epichlorhydrin is then added rapidly to the stirred reaction mass. The initial reaction is somewhat exothermic so that a temperature rise occurs to some extent. After addition of the epichlorhydrin, heating is applied for several hours while stirring in order to complete the reaction. While still in molten state, the formed polyether is washed with water until free of base, and then heated to remove water.

The nature of the glyceryl polyethers from polyhydric phenols can be better understood by considering preparation of a particular product which is preferred for use in the invention. For convenience, this product will hereinafter be designated as polyether B.

*Polyether B*

Into a reaction vessel fitted with a stirrer, 4 mols of 2,2-bis(4-hydroxyphenyl)propane (bis-phenol) and 6.43 mols of sodium hydroxide as a 10% aqueous solution are introduced and heated to about 45° C. whereupon 5 mols of epichlorhydrin are added rapidly while agitating the mixture. The temperature is then adjusted so that the mixture is heated at about 100° C. to 105° C. for about 80 minutes. The mixture separates into a two-phase system and the aqueous layer is decanted. The product is then washed with hot water until neutral to litmus whereupon the resulting polyether is drained and dehydrated by heating at about 150° C.

The polyether has a softening point of about 100° C. (Durrans' mercury method). The molecular weight is 1400 measured ebulliosocopically in ethylene dichloride so average $n=3.7$. The equivalent weight to esterification is 175, which value is the grams of polyether that will esterify and combine completely with one gram molecule of fatty acid. This value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours heating. By back titrating the unreacted fatty acid with base, a measure is obtained from which the equivalent weight to esterification is calculated. The polyether also had an epoxy value of 0.103 equivalent per 100 grams and a hydroxyl value of 0.328 equivalent per 100 grams. The 1,2-epoxy equivalency is, therefore, 1.44.

In like manner, other polyethers of bis-phenol or of other dihydric phenols may be prepared which will have different molecular weights and values for $n$ depending upon the molar ratio of epichlorhydrin to dihydric phenol used in preparation thereof. This fact is illustrated with various glyceryl polyethers of bis-phenol made with variation in molar ratio as shown in the following table.

| Polyether | Mol Ratio Epichlorhydrin to bis-Phenol | Mol Ratio NaOH to Epichlorhydrin | Softening Point, ° C. | Mol Wt. | $n$ | Equiv. Wt. to Esterification | 1,2-Epoxy Equivalency |
|---|---|---|---|---|---|---|---|
| A | 1.57 | 1.2 | 71 | 900 | 2.0 | 130 | 1.8 |
| B | 1.25 | 1.1 | 100 | 1,400 | 3.7 | 175 | 1.4 |
| C | | | 130 | 2,900 | 9.0 | 190 | 1.4 |

Polyethers of still higher molecular weight are best obtainable by reacting a polyether of lower molecular weight with a small quantity of dihydric phenol. For example, a resinous polyether having a softening point of about 130° C., a molecular weight of 2900 and an equivalent weight to esterification of 190 is obtained by reacting polyether A with an added 5% of bis-phenol. This reaction is effected by heating the polyether to 150° C., and then adding the bis-phenol. The heating is continued for about two hours while stirring the reaction mass and gradually increasing the temperature to about 200° C. This product, designated as polyether C, is listed in the above table.

The process of the invention comprises heating and esterifying glycidyl polyether of a polyhydric phenol having a 1,2-epoxy equivalency greater than 1.0 and containing alternating glyceryl radicals and aromatic hydrocarbon radicals united chain-wise by ether oxygen atoms with glyceryl radicals at each end thereof, with a drying oil fatty acid in amount of about 25% to 65% of the equivalent quantity needed to esterify completely the polyether, the heating being continued with removal from the reaction mixture of formed water of reaction until the ester product has an acid number of less than 10, and then further esterifying the ester product as a solution in aromatic hydrocarbon solvent with about an added 1% to 3% of orthophosphoric acid ($H_3PO_4$) based upon the weight of the ester product from the first step of the process.

The ester product obtained in the first step of the process contains alcoholic hydroxyl groups, but no epoxy groups. Owing to the much greater reactivity of the epoxy groups than alcoholic hydroxyl groups with free fatty acids, the epoxy groups are converted first to ester groups by an addition reaction wherein a molecule of fatty acid combines with an epoxy group to give a terminal glyceryl radical having an acyloxy radical and an alcoholic hydroxyl group linked thereto. Continuation of the esterification in the first step causes the remaining free fatty acid to esterify part of these formed alcoholic hydroxyl groups as well as alcoholic hydroxyl groups initially present in the polyether. The esterification is continued until substantially all of the drying oil fatty acid in the reaction mixture is esterified as evidenced by reduction in the acid number to less than 10, preferably to less than 5, and often to about 1 or less. The resulting ester product contains alcoholic hydroxyl groups primarily because insufficient drying oil fatty acid is heated and esterified with the polyether. Thus there is used about 25% to 65% of the equivalent amount needed to esterify completely the polyether and thereby convert all the epoxy groups and hydroxyl groups to ester groups. Preferably about 45% to 55% of the equivalent quantity of drying oil fatty acid is used.

Any of the drying oil acids are suitable for use in the process including the acids derived from linseed, soyabean, perilla, tung, walnut, oiticica and dehydrated castor oil. The drying oil fatty acids are well known in the art.

The esterification of the polyether with the drying oil fatty acid is effected by heating the mixture of reactants at about 125° C. to 275° C. Stirring is helpful and preferably the esterification is conducted in an inert atmosphere such as by sparging with nitrogen or carbon dioxide. The water of reaction is boiled from the reaction mixture. Although not essential for this purpose, use of an inert azeotroping agent capable of removing formed water by distillation in usual fashion is desirable at times. Xylene is an excellent material for such use, although other suitable agents include benzene, toluene and aromatic petroleum distillates. In preparing the ester, the heating and esterification is continued until the acid number of the product (solids basis) is reduced to less than 10, a fact which may be ascertained by withdrawing samples of the reaction mixture and subjecting them to conventional analysis.

The partially esterified polyether obtained in the first step of the process is reacted and further esterified with orthophosphoric acid. This further esterification is effected with the initial ester product contained as a solution in aromatic hydrocarbon solvent such as benzene, toluene, xylene or aromatic petroleum hydrocarbons. The ester is normally contained as about a 30% to 60% concentration by weight in the solvent. When an aromatic hydrocarbon solvent is employed in the first step as an azeotropic agent to remove formed water, it is convenient to employ the resulting solution of ester product for the further reaction with phosphoric acid.

The phosphoric acid is used in amount of about 1% to 3% by weight of the drying oil acid partial ester of the polyether. Upon addition of the phosphoric acid to the ester solution, the further esterification reaction occurs. For this purpose, low temperatures such as about 15° C. to 40° C. are satisfactory, although higher temperatures may be used if desired in order to shorten the time of reaction which will take about 2 days at 20° C. Formed water of esterification is decanted from the mixed ester product which may contain some free hydroxyl groups or may have all of the hydroxyl groups esterified, the presence or absence of hydroxyl groups being primarily dependent upon the particular polyether employed in the process, and the proportions of drying oil fatty acid and phosphoric acid used therein.

The mixed ester product is applied to metal surfaces by brushing or spraying where it hardens by air drying or baking. The rate of hardening is increased by incorporating a drier with the mixed ester such as about 0.02% to 0.1% cobalt as the naphthenate salt. Use of baking temperatures between about 100° C. and 200° C. gives satisfactory hardening in about 30 minutes to an hour.

If desired, pigments such as zinc chromate may be incorporated with the mixed ester, and in such cases it is possible to obtain satisfactory results with one coat of the primer in place of the etch primer and undercoat previously used.

The primer of the present invention has been found to give particularly satisfactory results in cases where the surface coating is an alkyd resin varnish or paint.

The mixed ester primer gives good results on surfaces which consist wholly or primarily of iron, cobalt, nickel or copper, as well as on surfaces consisting wholly or primarily of aluminum, zinc or magnesium.

The invention is illustrated by the following examples which are not to be construed as limiting the scope of the invention. The parts and percentages are by weight.

*Example 1*

A mixture of 55 parts of polyether B and 45 parts of dehydrated castor oil fatty acid was charged to a closed kettle and heating started in an atmosphere of nitrogen. The proportion of reactants was such that the acid amounted to about 51% of the quantity needed to esterify completely the polyether. At about 120° C. a stirrer was started and heating continued until a temperature of about 260° C. was reached. The water of reaction was expelled through a condenser as formed by sparging the reaction mixture with a slow stream of nitrogen. Samples were withdrawn periodically for determination of acid number. The heating was continued until an acid number of 1.0 was reached. The heating was then stopped, and after the product had cooled to about 205° C., the partial ester was thinned with sufficient xylene that the resulting solution contained 50% of ester.

One part of orthophosphoric acid was added to 70 parts of the xylene solution and allowed to react at about 20° C. After 48 hours, an aqueous layer separated and was discarded to leave the desired mixed ester in solution.

To the solution of mixed ester was added 0.05% cobalt (solids basis) as the naphthenate salt. Application of the mixture as a coating to sheet metal panels gave hardened films by air drying in 12 hours, or by baking at about 150° C. in 30 minutes. The clear films had excellent adhesion to sheet steel and aluminum, and the films of the coated panels withstood flexing over a one-eighth inch diameter mandrel without fracture. Similarly prepared films which were pigmented with zinc chromate, and with red iron oxide in a pigment to binder ratio of 2:1, and applied to steel and aluminum panels withstood immersion in water (panels partly immersed and partly in air) for eight weeks without any sign of breakdown.

*Example 2*

The mixed ester in xylene solution was prepared as described in Example 1. Cobalt naphthenate was incorporated with the solution to provide 0.04% of cobalt based upon the weight of mixed ester. The solution was then brushed on both sides of sheet zinc panels and allowed to dry in the air.

The resulting films were found to be flexible and to adhere well to the zinc. An iron ball of one pound weight was dropped on a coated panel from a height of 12 inches without rupturing the film. Upon immersing a coated panel in an aqueous solution containing 3% of sodium hydroxide for 90 days at a temperature of 20° C., no dullness was produced on the film surface nor any separation of the film from the zinc panel. When the strength of the caustic soda was increased to 5%, the same degree of resistance to deterioration was maintained for 50 days.

I claim as my invention:

1. A process of preparing a mixed ester which comprises heating and esterifying glycidyl polyether of a polyhydric phenol having a 1,2-epoxy equivalency greater than 1.0 and containing alternating glyceryl radicals and aromatic hydrocarbon radicals of the phenol united in a chain by ether oxygen atoms with glyceryl radicals at each end thereof, first with a drying oil fatty acid in amount of about 25% to 65% of the equivalent quantity needed to esterify completely the polyether, said heating being continued with removal of formed water until the ester product has an acid number of less than 10 and is devoid of epoxy groups, and then further esterifying the ester product as a solution in aromatic hydrocarbon solvent with about an added 1% to 3% of orthophosphoric acid based upon the weight of said ester product.

2. A process of preparing a mixed ester which comprises esterifying glycidyl polyether of a dihydric phenol having a 1,2-epoxy equivalency between 1.2 and 2.0, and containing alternating glyceryl radicals and aromatic hydrocarbon radicals united in a chain by ether oxygen atoms with glyceryl radicals at each end thereof, by first heating said polyether with a drying oil fatty acid in amount of about 25% to 65% of the equivalent quantity needed to esterify completely the polyether, said heating being continued with removal of formed water until the ester product has an acid number of less than 10 and is devoid of epoxy groups, and then further esterifying the ester product as a solution in aromatic hydrocarbon solvent with orthophosphoric acid in amount of about an added 1% to 3% of the weight of said ester product.

3. A process as defined in claim 2 wherein the dihydric phenol is 2,2-bis(4-hydroxyphenyl)propane, the esterification of the polyether with drying oil fatty acid is effected at about 125° C. to 275° C., and the drying oil fatty acid is dehydrated castor oil fatty acid.

4. A process as defined in claim 2 wherein the dihydric phenol is 2,2-bis(4-hydroxyphenyl)propane, the esterification of the polyether with drying oil fatty acid is effected at about 125° C. to 275° C., and the drying oil fatty acid is linseed oil fatty acid.

5. A process as defined in claim 2 wherein the dihydric phenol is 2,2-bis(4-hydroxyphenyl)propane, the esterification of the polyether with drying oil fatty acid is effected at about 125° C. to 275° C., and the drying oil fatty acid is soyabean oil fatty acid.

6. A process of preparing a mixed ester which comprises esterifying glycidyl polyether of 2,2-bis(4-hydroxyphenyl)propane having a 1,2-epoxy equivalency between 1.2 and 2.0, an equivalent weight to esterification of about 175, and containing alternating glyceryl radicals and 2,2-bis(4-phenylene)propane radicals united in a chain by ether oxygen atoms with glyceryl radicals at each end thereof, by first heating about 55 parts by weight of said polyether with about 45 parts by weight of dehydrated castor oil fatty acid at a temperature of about 125° C. to 275° C., said heating being continued with removal of formed water until the ester product has an acid number of about 1 and is devoid of epoxy groups, and then further esterifying the ester product as about a 50% by weight solution in xylene with about 3 parts by weight of orthophosphoric acid at about 20° C. for 48 hours.

References Cited in the file of this patent

UNITED STATES PATENTS

| | | |
|---|---|---|
| 2,456,408 | Greenlee | Dec. 14, 1948 |
| 2,500,765 | Montague | Mar. 14, 1950 |
| 2,541,027 | Bradley | Feb. 13, 1951 |